United States Patent [19]

Daniels

[11] 4,243,079
[45] Jan. 6, 1981

[54] APPARATUS FOR AND METHOD OF IN SITU APPLICATION OF LUBRICANT TO A WICK

[75] Inventor: Nicholas R. Daniels, St. Louis, Mo.

[73] Assignee: Emerson Electric Co., St. Louis, Mo.

[21] Appl. No.: 39,739

[22] Filed: May 16, 1979

[51] Int. Cl.³ ............................................. B65B 3/04
[52] U.S. Cl. ..................................... 141/1; 141/325; 184/1 R; 184/64
[58] Field of Search .......................... 141/1, 31, 325; 184/3 R, 16, 64, 102, 1 R; 222/187; 308/82, 87, 99, 102, 104, 111, 125, 132, 171; 118/264–271; 401/198, 283

[56] References Cited

U.S. PATENT DOCUMENTS

| 2,575,632 | 11/1951 | Lipman | 222/187 |
| 3,420,335 | 1/1969 | Dochterman | 184/64 |

Primary Examiner—Houston S. Bell, Jr.
Attorney, Agent, or Firm—Polster, Polster and Lucchesi

[57] ABSTRACT

Apparatus for and method of the in situ application of a controlled or known quantity of lubricating oil to the wick lubrication system of a fractional horsepower electric motor or the like.

13 Claims, 5 Drawing Figures

APPARATUS FOR AND METHOD OF IN SITU APPLICATION OF LUBRICANT TO A WICK

BACKGROUND OF THE INVENTION

This invention relates to apparatus for and a method of in situ application of lubricating oil in a lubrication wick installed within its wick support structure. More particularly, this invention is related to the in situ application of a known or desired quantity of lubricating oil into the wicks comprising a wick lubrication system in a fractional horsepower electric motor or the like which supplies lubricant to the bearings of the motor.

Many fractional horsepower motor utilize felt wicks or the like to supply lubricating oil to the rotor bearings of the motor. These bearings may be journal bearings (either sleeve or spherical bearings), or, in some instances, roller element bearings. Typically, the lubricating wick surrounds the rotor shaft of the motor and a portion of the wick is in contact with the shaft so as to continuously supply lubricating oil to the shaft which in turn is then carried into the bearing. In certain motor designs, the lubricating system includes a reservoir wick which contains a supply of lubricant and a lubricant applying wick which is in contact with the reservoir wick and with the shaft or bearing for transferring lubricant from the reservoir wick to the bearing. Also, many electric motors are provided with tubes, slingers, oil catching and retaining shields, and other wicks which collect excess lubricating oil ejected from the bearings and return it to the reservoir wick.

The various wicks in an electric motor are typically carried in the end shields or in other stationary portions of the motor which surround and support the bearing to be lubricated. As is now conventional, the wicks are impregnated (i.e., saturated) with lubricating oil prior to their installation in their respective supporting structures. In practice, it has been found that after the wicks have been installed, there may be significant variations between identical motors as to the quantity of lubricant actually contained in their respective lubricating wicks. This in turn has a direct effect on the minimum operational time of the motor until the wicks need to be reoiled or in some instances on the service life of the motor. Thus, it is highly desirable that the wicks of the motor reliably have a known quantity of oil therein after they have been installed so that the service lives for the motors will be more uniform.

Among many possible reasons for the variation of the amount of lubricant actually contained in the wicks after installation in the motor, it will be appreciated that at some time prior to their installation in a motor, the wicks must be removed from the lubricant in which they were soaked or immersed for filling them with lubricant. Of course, some of the lubricant will drain from the wicks while they are awaiting installation in the motor. Also, if a wick is immediately installed, it will, in all likelihood, have a maximum amount of lubricant therein. However, under actual production or manufacturing conditions, considerable variations may be present between the time the wicks of different motors are installed. Also, certain of the wicks must, out of necessity, be at least partially deformed so as to enable them to be installed in their respective supporting structures. This deformation of the wick has the effect of wringing oil from the wick. Still further, the installation of pre-impregnated wicks is a messy operation. In certain instances, it is highly desirable to keep certain areas of the motor or motor housing free from oil (e.g., surfaces which are intended to be subsequently adhesive bonded together) thus necessitating extra precautions or steps during the manufacture of the motor. This in turn adds to the cost of the motor.

Among the several objects and features of the present invention may be noted the provision of apparatus for and the method of the in situ application of a metered or controlled quantity of lubricating oil in a lubricating wick after it has been installed in its supporting structure;

The provision of such apparatus and method for insuring that each and every wick has the prescribed quantity of lubricant installed therein;

The provision of such apparatus and method in which the lubricant is contained within the structure supporting the wick during the filling of the wick thus providing a cleaner assembly environment;

The provision of such apparatus and method which does not adversely disturb the wick from its position as it is installed in its wick support structure;

The provision of such method and apparatus which may be utilized with automated production equipment to fill the wicks of electric motors or the like with lubricant at normal production speeds;

The provision of such apparatus and method which injects or applies a maximum amount of lubricant into the wick in a mimimum amount of time substantially without spillage or waste of the lubricant;

The provision of such apparatus which is of simple and rugged construction and which is reliable in operation; and The provision of such apparatus and method which may be readily adapted to apply lubricant to a variety of wick configurations installed in various electric motor designs.

Other objects and features of this invention will be in part apparent and in part pointed out hereinafter.

SUMMARY OF THE INVENTION

Briefly, apparatus of this invention is intended for the in situ application of liquid lubricating oil in a lubrication wick installed in a wick support. The wick has a central opening therethrough of generally circular cross section and the wick support extends at least in part around the wick. The apparatus comprises an outer member adapted to sealably engage the wick support thereby to enclose the wick within the wick support and the outer member, and an inner member movable relative to the outer member in generally axial direction with respect to the central wick opening between a retracted position in which the inner member is substantially clear of the wick and the central opening therein when the outer member is in sealable engagement with the wick support and an extended position in which the inner member extends into the central wick opening and in which the exterior of the inner member is proximate the portion of the wick which defines the central opening therethrough. The inner member has a flow passage therein which is adapted to be connected to a supply of lubricating oil for applying a predetermined quantity of lubricating oil to the wick. The flow passage includes a main passage and a plurality of distribution passages leading from the main passage to the exterior of the inner member for application of the lubricating oil onto the wick.

The method of this invention for the in situ application of a desired quantity of liquid lubricating oil in a wick will now be briefly stated. Generally, the wick has an opening therethrough and is enclosed at least in part by the structure supporting the wick. The method comprises the steps of sealably enclosing the wick, inserting a lubricant applying member into the wick opening with the lubricant applying member being proximate to the walls of the wick defining the opening and having a plurality of lubricant applying orifices approximate to the wick walls with thr orifices being spaced around the exterior of the lubricant applying member. Then, a desired quantity of lubricant is applied to the wick via the orifices and, after application of the lubricant, the lubricant applying member is removed or retracted from the wick opening.

BRIEF DESCRIPTION OF THE DRAWINGS

FIG. 4 is a view of a portion of the inside face of an end shield of a fractional horsepower electric motor or the like.

Corresponding reference characters indicate corresponding parts throughout the several views of the drawings.

DESCRIPTION OF PREFERRED EMBODIMENTS

Figure 1:
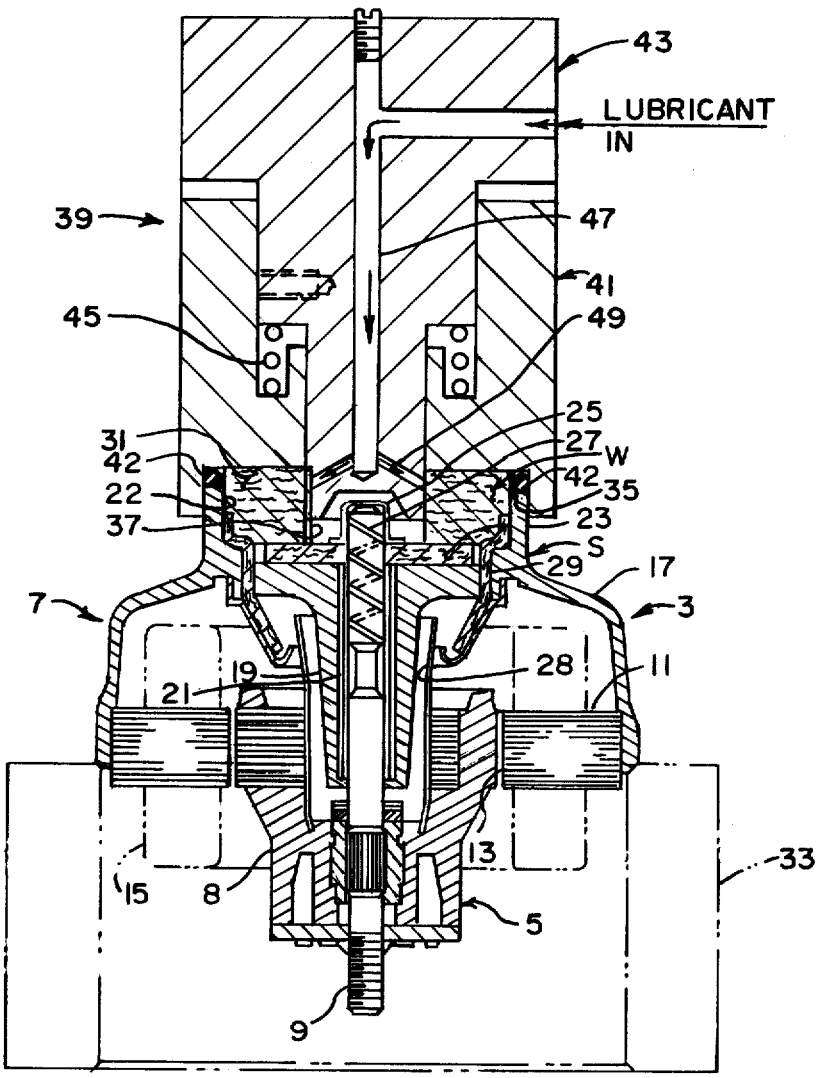
FIG. 1 is a vertical longitudinal cross sectional view of an electric motor having a lubricating wick installed therein and apparatus of the present invention for the in situ application of filling of the wick with suitable lubricating oil.

Referring now to the drawings, a first embodiment of the apparatus of the present invention is illustrated for the application of the desired quantity or volume of liquid lubricating oil into a lubricating wick system W installed in its wick support structure S. More specifically, wick lubricating system W is shown to be a wick lubricating system for an electric motor as generally indicated at 3. The motor shown is a so-called unit bearing motor having a rotor assembly 5 and a stator assembly 7. The rotor assembly includes a die cast rotor body 8 having a central shaft 9 extending endwise therefrom. The stator assembly includes a core 11 having a bore 13 therewithin of such size as to readily rotatably receive the rotor body as shown in FIG. 1. The stator assembly further includes a plurality of coil windings 15 (shown in phantom) received in slots (not shown) provided in the core. The core together with its windings is mounted within a housing or stator shell 17. The closed end of the motor housing constitutes an end shield for the motor and it includes a integral bearing hub 19 which is adapted to rotatably receive and to journal one end of shaft 9. As is typical with unit bearing motors, only one bearing journals the rotor assembly within the stator assembly. Suitable bearing sleeves 21, such as are well known in the art, are provided within hub 19 for journaling shaft 9. As shown, housing 17 has a receptacle 22 therewithin for reception of wick lubricating system W as will be hereinafter specified.

Shaft 9 extends somewhat beyond the end of hub 19 into receptacle 22 and a lubricating oil applying wick 23 surrounds the shaft and is in lubricant applying contact therewith. A push nut 25 is secured in place on the end of shaft 9 so as to secure rotor assembly 5 in position with respect to the stator and so as to permit the rotor to rotate freely within bore 13 of the stator. Shaft 9 has a helical oil groove 27 on its outer surface for picking up lubricating oil from wick 23 and for conveying it lengthwise along the shaft thereby to provide lubrication to bearing sleeve 21. Excess oil is forced out the inner end of hub 19 where it is slung outwardly by the centrifugal force of the rotating rotor assembly. An oil return tube 28 fastened to and rotatable with rotor body 8 collects the oil and returns it to an oil return wick 29 which in turn feeds the oil back to a reservoir wick 31. Thus, it can be seen that wick lubrication system W is a closed loop oil lubrication system which is comprised generally by wicks 31, 23 and 29. It will further be understood that after assembly of motor 3 is complete, a sheet metal cover or cap may be sealably fitted in receptacle 22 so as to enclose wick 31 and to prevent leakage of oil and contamination of the oil. This cap may constitute a portion of wick support structure S.

In accordance with the apparatus and method of the present invention, motor 3 may be assembled to the state shown in FIG. 1 with wicks 23, 29 and 31 in place within motor housing 17 and with the wicks dry (i.e., containing no lubricating oil). Then, the wicks may have a predetermined quantity or volume of lubricating oil applied thereto while the wicks are in their respective installed positions within the motor housing substantially without spillage or waste of the lubricant and in a mimimum length of time. In FIG. 1, motor 3 is shown to be installed on a motor support stand 33 (shown in phantom) with the wick end of housing 17 (i.e., receptacle 22) facing upwardly. As shown, wick 31 is a circular wick of suitable felt material so sized as to fit snugly within the open end of the housing and so as to extend up above the edge 35 of the housing. Further, wick 31 has a central opening 37 extending therethrough. The bottom face of wick 31 engages lubricant application wick 23 so as to feed lubricant thereto and oil return wick 29 is in contact with the outer periphery of wick 31.

Figure 2:
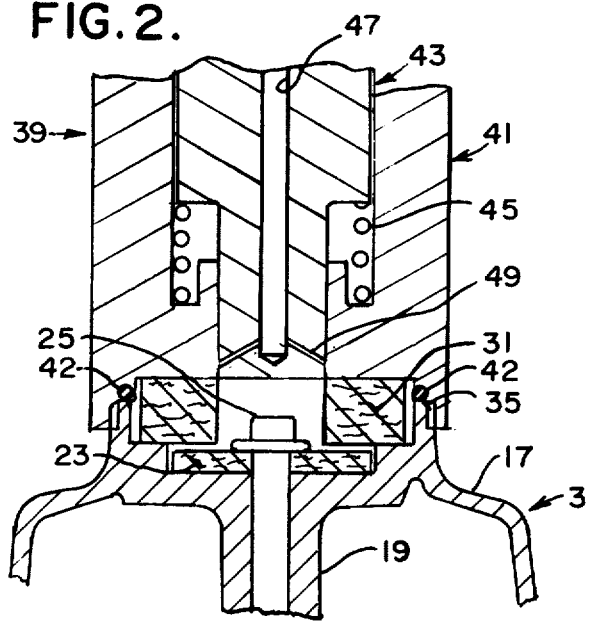
FIG. 2 is a view similar to a portion of FIG. 1 illustrating the apparatus of the present invention in its retracted position.

A first embodiment of apparatus of this invention, as indicated generally at 39, is provided for the in situ application of a desired quantity of lubricating oil to wick system W. Apparatus 39 is shown to comprise an outer member or body 41 movable between a raised retracted position (not shown) in which it is clear of motor 3 and a lowered position (as shown in FIGS. 1 and 2) in which the bottom of the outer member sealably engages end 35 of housing 17. The bottom end of outer member 41 is counterbored so as to receive housing end 35 and so as to receive the portion of wick 31 which extends up above end 35 of the housing substantially without (or with only a slight) compression of the wick. A compressible seal or gasket 42 is provided in the counterbore for sealable engagement with housing end 35. The apparatus further includes an inner member 43 slidably movable in axial direction with respect to outer member 41 between a retracted position (see FIG. 2) in which its lower end is clear of wick 31 and the central opening thereof and an extended position (as shown in FIG. 1) in which the inner member fits closely within opening 37 in wick 31 and in which the outer surface of the inner member is in close proximity to (preferably touching) the walls of wick 31 defining opening 37. Inner member 43 is biased by a compression coil spring 45 relative to outer member 41 toward the relative positions of the member shown in FIG. 2. Inner member 43 has an oil passage 47 extending therethrough. A plurality of distributing passages or orifices 49 are provided in the lower part of the inner member so as to permit the flow of lubricating oil from passage 47 to the exterior of the inner member and onto wick 31. As shown, six distributing passages or orifices 49 are provided at equal angular intervals around the lower end of inner member 43. However, it will be understood that any number of orifices 49 may be utilized.

Apparatus 39, as adapted for actual production of electric motors 3, may be mounted in a suitable production machine so as to readily receive a motor whose wick lubrication system W is to be filled with lubricant with the motor supported on motor support 33. The apparatus is then brought into sealable engagement with the upper end of the motor housing (as shown in FIG. 2) by means of a downwardly operable ram (not shown) such that the outer member 41 and seal 42 sealably engage the upper edge 35 of motor housing 17. Then, inner member 43 is forced downwardly relative to outer member 41 into its extended position so that it is received within opening 37 of wick 31. Passage 47, of course, is connected to a suitable source of liquid lubricating oil which supplies a measured or metered quantity of oil to wick 31 via outlet passages 49. With outer member 41 and seal 42 sealably engaging housing 17 and totally enclosing the wick between its support structure S and the apparatus of the present invention, the leakage or escape of lubricating oil from the wick or the motor is substantially precluded while the wick is being filled with lubricant.

After the lubricant has been applied to the wick, inner member 43 is withdrawn from opening 37. While inner member 37 is being withdrawn, outer member 41 and seal 42 remain in engagement with housing end 35 and the outer member remains in engagement with the upper face of wick 31 so that the wick remains undisturbed in its support as the inner member 43 is withdrawn. It will be appreciated that the oil need not be forceably injected into wick 31 under high pressure, but rather only such pressure as may be necessary to effect a relatively fast discharge of the lubricating oil from orifices 49. If any excess oil is not immediately absorbed by wick 31, it can be seen that it will remain within opening 31 subsequent to the withdrawal of inner member 43 and that this oil will soon be absorbed by wicks 23 and 31. The quantity of oil injected into the motor will of course vary depending on the size of the motor, the number of wicks to be filled or impregnated by the oil, and the particular design of the wick lubrication system.

Figure 3:
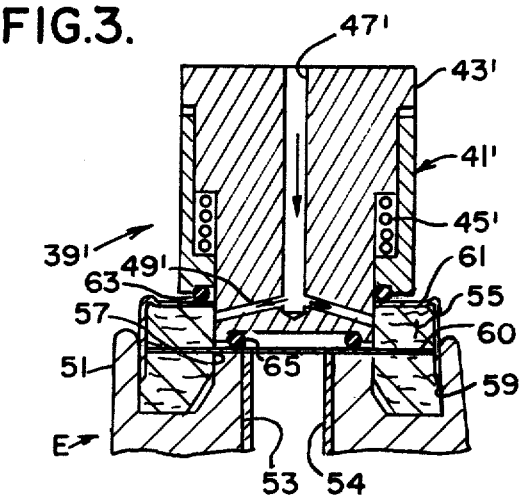
FIG. 3 is a vertical longitudinal cross sectional view of another embodiment of apparatus of the present invention.

Referring now to FIG. 3, another embodiment of the apparatus of the present invention is indicated in its entirety at 39'. This apparatus is intended for the application of liquid lubricating oil to the lubricating wick system of an electric motor of a different design from motor 3 shown in FIG. 1. More specifically, this electric motor 3' typically has a pair of end shields E, one at each end of the stator, for receiving and journalling the rotor shaft. Typically, these end shields are of die cast construction and have a bearing hub 51 cast therein with a bore 53 therethrough for the reception of a sleeve bearing 54 in which the rotor shaft of the motor is journalled. A wick 55 generally circular in cross section and having a central opening 57 therethrough is fitted into a groove 59 provided in hub 51. This wick feeds lubricating oil to bearing 54 either by a portion of the wick (not shown) in contact with the shaft, or, in some instances, by another liquid lubricant applying wick (also not shown). A thrust plate 60 is provided in hub 51. Wick 55 is held in place within groove 59 and is at least partially enclosed by a sheet metal cup 61 which is press fitted into place in the portion of the bearing hub defining groove 59.

Apparatus 39' includes an outer member 41' which sealably engages the hub 51 (e.g., cup 61), and an inner member 43' which is movable relative to the outer member between a retracted position (not shown) in which it is clear of the wick in an extended position (as shown in FIG. 3) in which it may (but not necessarily) fit closely within opening 57 of the wick. A spring 45' biases inner member 43' apart from member 41'. Inner member 43' includes a lubricant passage 47' and a plurality of distributing orifices 49' between passage 47 and the outer surface of the inner member for the purpose of supplying a predetermined quantity of lubricating oil to wick 55. Outer member 41' is provided with a compressible seal or gasket 63 for sealable engagement with cup 61 thereby to enclose wick 55 within hub 51 and within apparatus 39' of the present invention when this apparatus is in its lubricant applying position as shown in FIG. 3. Further, a compressible seal or gasket 65 is carried on the bottom end of inner member 43' for sealably engaging hub 51 around bearing 54 thereby to seal off wick 55 from the bore of the bearing. Thus, upon application of a given amount of lubricant to wick 55 via passage 47' and orifices 49' in inner member 43', the wick is totally enclosed thus ensuring that the entire quantity of lubricant enters the wick without leaking or spilling.

Figure 4:
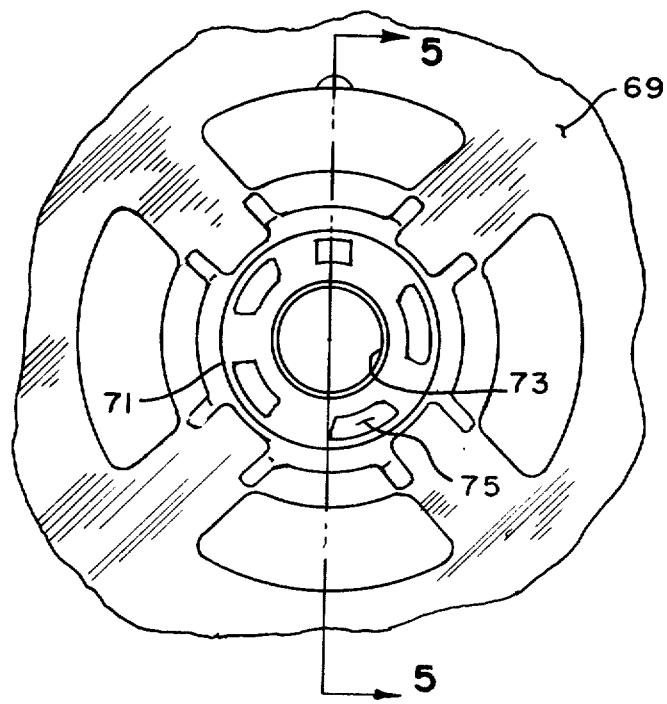
Figure 5:
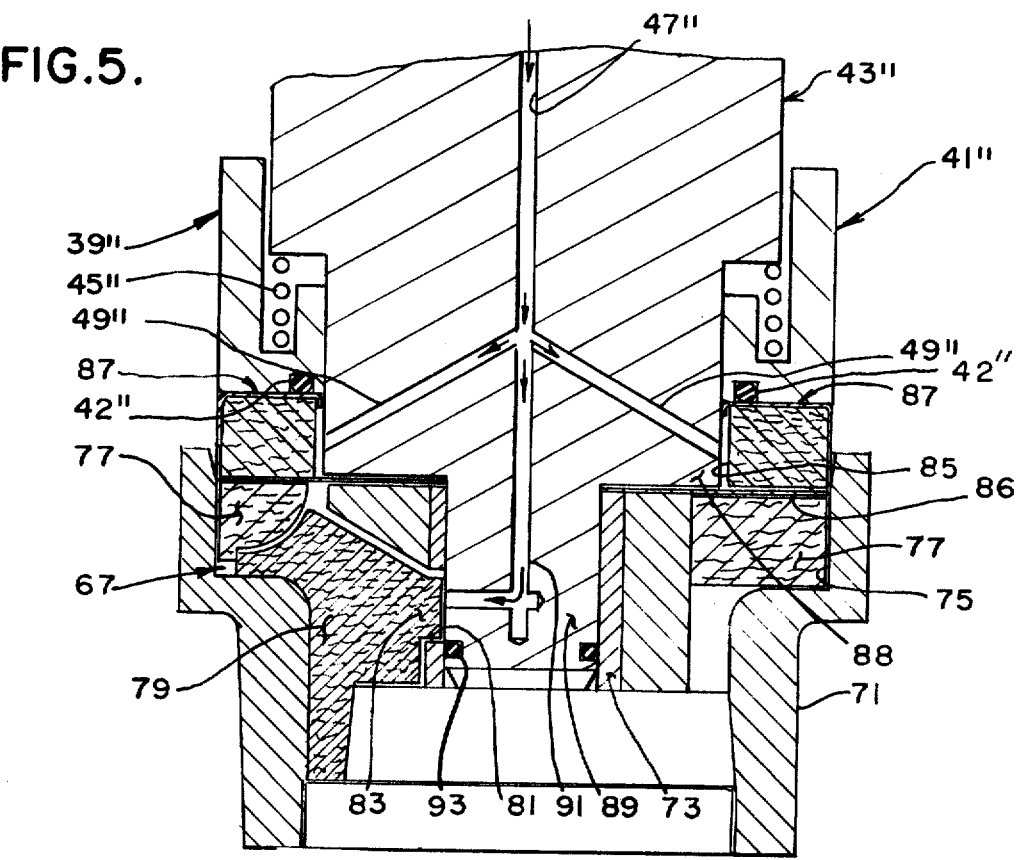
FIG. 5 is an enlarged cross sectional view of the end shield taken along line 5—5 of FIG. 4 illustrating still another embodiment of the apparatus of the present invention.

FIGS. 4 and 5 illustrate still another embodiment of the apparatus of the present invention as illustrated at 39". As with apparatus 39' heretofore described, apparatus 39" is intended for the in situ application of a known quantity of liquid lubricating oil into a wick lubrication system 67 as may be installed in an end shield 69 of an electric motor or the like. As shown in FIG. 4, a portion of end shield 69 is illustrated. The end shield includes a central hub 71 having a sleeve bearing 73 fitted therein. A groove 75 surrounds the bearing and is adapted to receive a reservoir wick 77 and a lubricant feeding or auxiliary wick 79. A window 81 is provided through sleeve bearing 73 and feeding wick 79 has a portion 83 thereof which is adapted to fit through window 81 and to apply lubricating oil to the rotor shaft (not shown) which is adapted to be received in the bearing. Reservoir wick 77 is shown to be in lubricant feeding relation with wick 79 and is intended to hold a supply of lubricant for wick 79. The reservoir wick has a central opening 85 therethrough. A thrust plate 86 is disposed between the inner face of wick 77 and the end shield, and a retaining cap 87 is pressed into the inside of hub 71.

As shown, apparatus 39" has an outer member 41" and an inner member 43" movable relative to one another between a retracted position (not shown) in which the bottom surface of the inner member is clear of wick 77 and hub 71 when the outer member and more particularly seal 42" is in sealable engagement with the hub (as shown in FIG. 5) and an extended position (as shown in FIG. 5) in which a first portion 88 of the inner member fits within central opening 85 of wick 77 and in which a reduced diameter extended portion 89 fits closely within the bore of bearing 73. Inner member 43" includes an oil passage 47" and a plurality of distribution passages or orifices 49" for application of lubricating oil to wick 77. Further, passage 47" extends axially downwardly into extension 89 and an outlet passage 91 is provided between passage 47" in the exterior of the extension so as to permit the application of lubricating oil to the portion 83 of wick 79 which protrudes out through window 81. In addition, extension 89 may optionally carry a seal 93 which seals the bore of bearing 73 thus totally enclosing wicks 77 and 79 during the in situ force application of lubricant thereto.

As shown, apparatus engages the hub 71 of its respective end shield 69 from the inside face thereof (i.e., from the side of the end shield which normally faces inwardly toward the rotor assembly of its respective motor) prior to installation of the end shield on the stator.

The method of this invention relates to the in situ filling of a wick lubrication system installed in a wick support structure, for example, an end shield or stator assembly of a fractional horsepower motor or the like. In particular, the method of this invention relates to the in situ application of a predetermined quantity or volume of lubricating oil to the wick lubrication system. The method of this invention involves sealably enclosing the wick lubrication system. Then a wick applying member (e.g., inner member 43) is inserted within a central opening in the wick. The lubricant applying member is proximate (preferably touching) to the walls of the wick defining the central opening therein and has a plurality of lubricant applying orifices (e.g., orifices 49) proximate the wick walls with the orifices being spaced around the exterior of the lubricant applying member. Then a desired quantity of liquid lubricant or lubricating oil is applied to the wick via the orifices. After application of the lubricant, the lubricant applying member is removed or withdrawn from the wick.

In view of the above, it will be seen that the several objects and features of this invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. Apparatus for in situ application of liquid lubricating oil to a wick lubrication system installed in a wick support, said wick lubrication system including wick means, said wick support extending at least in part around said wick means, said apparatus comprising an outer member adapted to sealably engage said wick support thereby to enclose said wick means within said wick support and said outer member, and an inner member movable relative to the outer member between a retracted position in which said inner member is substantially clear of said wick means when said outer member is in sealable engagement with said wick support and an extended position in which said inner member is proximate said wick means, said inner member having a flow passage therein adapted to be connected to a supply of lubricating oil for feeding a predetermined quantity of lubricating oil to said wick means, said flow passage including a plurality of orifices for the application of lubricating oil into said wick means.

2. Apparatus as set forth in claim 1 wherein said inner member is slidably mounted within said outer member.

3. Apparatus as set forth in claim 1 wherein said outer member is engageable with said wick means when said outer member is in sealing engagement with said wick support, and wherein said outer member remains in engagement with said wick means as said inner member is moved relative to the outer member from its extended to its retracted position thereby to hold the wick means in place relative to its wick support as said inner member is withdrawn from said opening.

4. Apparatus as set forth in claim 2 wherein a spring is interposed between said inner and outer members for biasing said inner member toward its retracted position with respect to said outer member.

5. Apparatus as set forth in claim 1 further including seal means carried by said outer member engageable with said wick support.

6. Apparatus as set forth in claim 1 further comprising seal means carried by said inner member sealably engageable with said wick support.

7. Apparatus as set forth in claim 1 wherein said wick means includes a first wick having an opening therethrough and an auxiliary wick axially displaced from said first wick and wherein said inner member includes auxiliary wick lubricating means comprising an extension extending axially from said inner member, said extension having an auxiliary lubricating passage therein in communication with said flow passage in said inner member, said auxiliary lubricating passage further having an outlet adapted to be generally in register with said auxiliary wick when said inner member is in its extended position.

8. Apparatus as set forth in claim 7 wherein said wick support structure includes a bore of smaller diameter than said opening in said first wick, said bore being coaxial with said opening and extending in the same direction as said auxiliary wick, a portion of said auxiliary wick being exposed to said bore in spaced axial direction from said first wick and being positioned for application of lubricating oil thereon from said outlet in said extension when said inner member is in its 9. Apparatus as set forth in claim 8 further comprising seal means carried by said extension sealably engageable with the portion of said wick support defining said bore therein.

10. Apparatus for the in situ application of a desired quantity of liquid lubricating oil to a wick lubrication system of a fractional horsepower motor or the like, said wick lubrication system comprising at least one wick generally surrounding the axis of the motor and being at least in part contained within the structure of the motor, said wick having a central opening therethrough which is generally coaxial with the axis of said motor, said apparatus comprising an outer member adapted to sealably engage said motor structure thereby to substantially enclose said wick within said motor structure and said outer member, said apparatus further comprising an inner member movable relative to said outer member between a retracted position in which said outer member is clear of said wick and an extended position in which said inner member fits into said central opening of said wick, said inner member having a passage therein adapted to be connected to a source of liquid lubricating oil for the flow therethrough of a predetermined quantity of liquid lubricating oil at selected times, said inner member further having a plurality of orifices in communication with said passage, said orifices being proximate the walls of said wick defining said central opening whereby said predetermined quantity of lubricating oil may be applied to said wick.

11. The method of in situ application of a desired quantity of liquid lubricant to a wick after the wick has been installed in an electric motor or the like, said wick having a opening therethrough and being enclosed at least in part by the structure of said motor, wherein the method of this invention comprises the steps of:

bringing a first member into sealable engagement with said motor thereby to substantially enclose said wick within said first member and the structure of the motor supporting said wick;

inserting a lubricant applying member into said wick opening, said lubricant applying member being proximate to the walls of said wick defining said opening and having at least one lubricant applying orifice proximate said wick walls;

applying a desired quantity of lubricant to said wick via said orifice; and removing said lubricant applying member from said wick opening and removing said first member from said motor.

12. The method as set forth in claim 11 wherein said first member engages said wick, and wherein as said lubricant applying member is retracted from said wick opening while said first member remains in engagement with said wick thereby to prevent the retraction of said lubricant applying member from unduly disturbing said wick.

13. Apparatus for the in situ application of liquid lubricating oil to a wick installed in a wick support, said wick support extending at least in part around said wick, said apparatus comprising a first member adapted to sealably engage said wick support thereby to enclose said wick within said wick support and said first member, and a second member movable relative to said first member between a retracted position in which said second member is substantially clear of said wick when the outer member is in sealable engagement with said wick support and an extended position in which said second member is proximate said wick, said second member having a flow passage therein adapted to be connected to a supply of lubricating oil for feeding a predetermined quantity of lubricating to said wick, said flow passage including a plurality of orifices for the application of lubricating oil onto to said wick from said second member when the second member is in its extended position.

* * * * *